(12) United States Patent
Sakai

(10) Patent No.: US 11,912,246 B2
(45) Date of Patent: Feb. 27, 2024

(54) VEHICLE SENSOR SYSTEM, VEHICLE PROVIDED WITH THE VEHICLE SENSOR SYSTEM, AND VEHICLE

(71) Applicant: KOITO MANUFACTURING CO., LTD., Tokyo (JP)

(72) Inventor: Masaru Sakai, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 418 days.

(21) Appl. No.: 16/648,942

(22) PCT Filed: Sep. 13, 2018

(86) PCT No.: PCT/JP2018/033961
§ 371 (c)(1),
(2) Date: Mar. 19, 2020

(87) PCT Pub. No.: WO2019/059083
PCT Pub. Date: Mar. 28, 2019

(65) Prior Publication Data
US 2020/0247367 A1    Aug. 6, 2020

(30) Foreign Application Priority Data

Sep. 20, 2017 (JP) .................. 2017-180320
Sep. 20, 2017 (JP) .................. 2017-180321
(Continued)

(51) Int. Cl.
*B60S 1/52* (2006.01)
*B60R 11/00* (2006.01)
*G01S 7/497* (2006.01)

(52) U.S. Cl.
CPC ............. *B60S 1/52* (2013.01); *B60R 11/00* (2013.01); *G01S 7/497* (2013.01); *G01S 2007/4977* (2013.01)

(58) Field of Classification Search
None
See application file for complete search history.

(56) References Cited

U.S. PATENT DOCUMENTS

2014/0307247 A1  10/2014  Zhu et al.
2014/0324266 A1  10/2014  Zhu et al.
(Continued)

FOREIGN PATENT DOCUMENTS

CN        106341609 A       1/2017
DE   10 2016 107 380 A1    11/2016
(Continued)

OTHER PUBLICATIONS

Office Action dated Jan. 28, 2022 by the State Intellectual Property Office of P.R. China in counterpart Chinese Patent Application No. 201811103129.X.
(Continued)

*Primary Examiner* — Cristi J Tate-Sims
(74) *Attorney, Agent, or Firm* — Sughrue Mion, PLLC

(57) ABSTRACT

This vehicle sensor system includes an on-board sensor (6f) that can be attached to a vehicle via an aiming mechanism (40); and a cleaner (50) that has a nozzle (103) for spraying a cleaning medium onto the vehicle sensor (6f). The nozzle (103) is attached to a component (21) the position of which changes in accordance with vehicle sensor (6f) aiming.

17 Claims, 12 Drawing Sheets

(30) Foreign Application Priority Data

Sep. 20, 2017 (JP) ................................ 2017-180322
Sep. 20, 2017 (JP) ................................ 2017-180323

(56) References Cited

U.S. PATENT DOCUMENTS

| | | |
|---|---|---|
| 2014/0333468 A1 | 11/2014 | Zhu et al. |
| 2014/0336935 A1 | 11/2014 | Zhu et al. |
| 2015/0078940 A1* | 3/2015 | Kikuta .................... F04B 17/03 |
| | | 417/443 |
| 2015/0090291 A1 | 4/2015 | Na et al. |
| 2015/0168556 A1 | 6/2015 | Zhu et al. |
| 2015/0183406 A1 | 7/2015 | Tanaka et al. |
| 2016/0282874 A1 | 9/2016 | Kurata et al. |
| 2016/0339875 A1 | 11/2016 | Ina et al. |
| 2017/0176641 A1 | 6/2017 | Zhu et al. |
| 2017/0210304 A1* | 7/2017 | Davies ................ H04N 5/23296 |
| 2017/0297536 A1 | 10/2017 | Giraud et al. |
| 2018/0015907 A1* | 1/2018 | Rice .......................... B60S 1/56 |
| 2018/0143298 A1* | 5/2018 | Newman ............ G01C 21/3484 |
| 2018/0186341 A1 | 7/2018 | Kimura et al. |
| 2018/0222450 A1 | 8/2018 | Kunze |
| 2018/0272998 A1* | 9/2018 | Schmidt ................ B05B 7/2424 |
| 2019/0061745 A1 | 2/2019 | Hatano |
| 2019/0179052 A1 | 6/2019 | Zhu et al. |
| 2019/0225194 A1 | 7/2019 | Baudouin et al. |
| 2019/0270432 A1 | 9/2019 | Ina |

FOREIGN PATENT DOCUMENTS

| | | |
|---|---|---|
| EP | 2 845 773 A1 | 3/2015 |
| EP | 2 873 572 A1 | 5/2015 |
| JP | 2013-18404 A | 1/2013 |
| JP | 2014-19403 A | 2/2014 |
| JP | 2014-201150 A | 10/2014 |
| JP | 2016-522886 A | 8/2016 |
| JP | 2016-187990 A | 11/2016 |
| WO | 2012/138455 A1 | 10/2012 |
| WO | 2015/068249 A1 | 5/2015 |
| WO | 2016/045828 A1 | 3/2016 |
| WO | 2017/002877 A1 | 1/2017 |
| WO | 2017/119364 A1 | 7/2017 |
| WO | 2017/154070 A1 | 9/2017 |
| WO | 2018/059841 A1 | 4/2018 |
| WO | 2018/135469 A1 | 7/2018 |

OTHER PUBLICATIONS

Search Report (PCT/ISA/210) dated Dec. 11, 2018, issued by the International Searching Authority in counterpart International Patent Application No. PCT/JP2018/033961.
Written Opinion (PCT/ISA/237) dated Dec. 11, 2018, issued by the International Searching Authority in counterpart International Patent Application No. PCT/JP2018/033961.
Extended European Search Report dated May 11, 2021, issued by the European Patent Office in counterpart European patent Application No. 18859749.6.

* cited by examiner

VEHICLE SENSOR SYSTEM, VEHICLE PROVIDED WITH THE VEHICLE SENSOR SYSTEM, AND VEHICLE

CROSS REFERENCE TO RELATED APPLICATIONS

This application is a National Stage of International Application No. PCT/JP2018/033961 filed on Sep. 13, 2018 claiming priority from Japanese Patent Application Nos. 2017-180320, 2017-180321, 2017-180322, 2017-180323 filed on Sep. 1, 2017 and the disclosures of which are incorporated herein in their entirety by reference.

TECHNICAL FIELD

The present invention relates to a vehicle sensor system and a vehicle with the vehicle sensor system.

Also, the present invention relates to a vehicle.

BACKGROUND ART

A vehicle headlamp cleaner is disclosed in PTL 1 and the like.

CITATION LIST

Patent Literature

PTL 1: JP-A-2016-187990

SUMMARY OF INVENTION

Technical Problem

It is recently intended to develop a vehicle capable of automatic driving. When implementing the automatic driving, it is required to favorably keep sensitivity of a LiDAR, for example. Therefore, a sensor cleaner for cleaning the LiDAR is needed.

An object of the present invention is to provide a vehicle sensor system capable of efficiently spraying a cleaning medium to an on-board sensor arranged on a vehicle, and a vehicle with the vehicle sensor system.

Also, an object of the present invention is to provide a vehicle sensor system in which when spraying a cleaning medium to an on-board sensor for cleaning, there is no concern that a design component of a vehicle will be smudged due to the cleaning medium, and false detection of the on-board sensor due to staying of the cleaning medium can be prevented, and a vehicle with the vehicle sensor system.

Also, an object of the present invention is to provide a vehicle capable of easily laying out a cleaner nozzle for a LiDAR, efficiently cleaning the LiDAR and preventing malfunction of a cleaner.

Also, an object of the present invention is to provide a vehicle capable of efficiently spraying a cleaning medium to a LiDAR arranged on a vehicle side part.

Solution to Problem

In order to achieve the above objects, a vehicle sensor system of the present invention includes:

an on-board sensor that can be attached to a vehicle via an aiming mechanism, and a cleaner having a nozzle configured to spray a cleaning medium toward the on-board sensor, wherein the nozzle is attached to a component configured to be displaced in accordance with aiming of the on-board sensor.

According to the configuration, even when a position of the on-board sensor is changed due to the aiming, a spraying direction of the cleaning medium from the nozzle can follow the position of the on-board sensor and a cleaning effect can be thus kept.

Also, in the vehicle sensor system of the present invention, the nozzle may be attached to a support component attached to the aiming mechanism.

In order to increase followability of the spraying direction of the nozzle to the on-board sensor, the support component for the nozzle is preferably attached to the aiming mechanism, for example.

Also, in the vehicle sensor system of the present invention, the nozzle may be attached to a support component attached to a main body of the on-board sensor.

In order to increase the followability of the spraying direction of the nozzle to the on-board sensor, the support component for the nozzle is preferably attached to the main body of the on-board sensor, for example.

Also, in the vehicle sensor system of the present invention, the cleaner may further include a check valve, and the check valve may be attached to the support component.

In order to prevent back-flow of liquid (a cleaning medium, water introduced from outside of the nozzle, or the like) from the nozzle to the cleaner, the check valve is preferably attached.

Also, in the vehicle sensor system of the present invention, a component configured to restrain a piping for supplying the cleaning medium from a main body of the cleaner to the nozzle may be attached to the support component.

According to the configuration, when aiming the on-board sensor, it is possible to prevent an influence due to deviation of the piping.

Also, in the vehicle sensor system of the present invention, the support component and the nozzle may be integrally configured.

According to the configuration, it is possible to easily enable the spraying direction of the cleaning medium from the nozzle to follow a position of the on-board sensor.

Also, a vehicle of the present invention includes the above-described vehicle sensor system.

According to the configuration, it is possible to efficiently spray the cleaning medium toward the on-board sensor arranged on the vehicle.

Also, in order to achieve the above objects, a vehicle sensor system of the present invention includes:

an on-board sensor having a cleaning target surface arranged to face toward an outside of a vehicle in a concave part provided to a design component configuring an outer appearance of the vehicle, a cleaner having a nozzle configured to spray a cleaning medium toward the cleaning target surface for cleaning, and a discharge hole formed to escape the cleaning medium from the cleaning target surface, wherein at least a portion of the discharge hole is provided at a portion of a part configuring the concave part of the design component.

According to the configuration, since the discharge hole for escaping the cleaning medium is provided, there is no concern that a design component will be smudged due to the cleaning medium. Also, since the cleaning target surface is provided in the concave part of the design component, the cleaning medium is likely to stand in the concave part, which may in turn cause false detection of the on-board sensor, and the like. However, the cleaning medium is escaped from the discharge hole, so that the false detection can be prevented.

Also, in the vehicle sensor system of the present invention, the nozzle may be attached to the design component.

According to the configuration, it is possible to easily spray the cleaning medium toward the on-board sensor arranged in the concave part of the design component.

Also, in the vehicle sensor system of the present invention, the design component may be attached to a vehicle body of the vehicle.

Since the cleaning medium sprayed from the nozzle is discharged from the discharge hole of the design component, it is possible to clean the on-board sensor without smudging the design component and the vehicle body having the design component attached thereto.

Also, in the vehicle sensor system of the present invention, the discharge hole may be formed as a gap between the design component and the vehicle body.

According to the configuration, it is possible to easily form the discharge hole.

Also, in the vehicle sensor system of the present invention, the discharge hole may be provided on an opposite side to the nozzle with respect to the cleaning target surface.

According to the configuration, it is possible to easily escape the cleaning medium sprayed toward the on-board sensor.

Also, a vehicle of the present invention includes the above-described vehicle sensor system.

According to the configuration, it is possible to provide the vehicle including the vehicle sensor system in which when spraying the cleaning medium toward the on-board sensor for cleaning, there is no concern that the design component of the vehicle will be smudged due to the cleaning medium, and the false detection of the on-board sensor due to staying of the cleaning medium can be prevented.

Also, in order to achieve the above objects, a vehicle of the present invention includes:

a LiDAR, and a cleaner capable of cleaning a cleaning target surface of the LiDAR, wherein the cleaner includes a nozzle provided above the LiDAR, and further protruding outside of the vehicle than a cleaning target surface of the LiDAR and configured to spray the cleaning medium at an acute angle toward the cleaning target surface in an operating state of the cleaner.

According to the configuration, since the nozzle of the cleaner is provided above the LiDAR, it is possible to prevent malfunction of the cleaner due to clogging of the nozzle, and the like, and to easily lay out the nozzle. Also, the cleaning medium is sprayed at an angle toward the cleaning target surface from the nozzle protruding further outward than the cleaning target surface of the LiDAR, so that it is possible to efficiently clean the cleaning target surface of the LiDAR.

Also, in the vehicle of the present invention, an incidence angle of the cleaning medium sprayed from the nozzle onto the cleaning target surface may be equal to or smaller than 45°.

In order to efficiently clean the cleaning target surface of the LiDAR, the incidence angle is preferably set within the range.

Also, in the vehicle of the present invention, the incidence angle may be 5° or greater and 30° or smaller.

In order to efficiently clean the cleaning target surface of the LiDAR, the incidence angle is more preferably set within the range.

Also, in the vehicle of the present invention, the cleaning target surface may be arranged further inside of the vehicle than an exterior surface of the vehicle.

For the LiDAR arranged in the above position, the nozzle configured as described above is more preferably used.

Also, in the vehicle of the present invention, the LiDAR may be arranged in a position lower than a top surface of a tire mounted to the vehicle.

For the LiDAR arranged in the above position, the nozzle configured as described above is preferably used.

Also, in order to achieve the above objects, a vehicle of the present invention includes:

a LiDAR having a cleaning target surface having a normal line extending to a side of the vehicle, and a cleaner capable of cleaning the cleaning target surface, wherein the cleaner includes a nozzle provided in front of the LiDAR with respect to the vehicle, and further protruding outside of the vehicle than the cleaning target surface of the LiDAR and configured to spray the cleaning medium at an acute angle toward the cleaning target surface in an operating state of the cleaner.

According to the configuration, since it is possible to spray the cleaning medium without opposing traveling wind, it is possible to efficiently the cleaning target surface of the LiDAR provided on a vehicle side part.

Also, in the vehicle of the present invention, the LiDAR may be arranged in at least one of a position lower than a top surface of a front wheel mounted to the vehicle and a further rear position of the vehicle than a central part of the front wheel.

For the LiDAR arranged in the above position, the nozzle configured as described above is preferably used.

Also, in the vehicle of the present invention, the nozzle may be integrated with a fender mole or an emblem of the vehicle.

According to the configuration, it is possible to attach the nozzle in an unnoticeable position on an exterior of the vehicle.

Also, in the vehicle of the present invention, a distance between a side turn signal lamp attached to the vehicle and the nozzle may be shorter than a distance between a front wheel of the vehicle and the nozzle.

According to the configuration, the nozzle is spaced from the front wheel as much as possible, so that it is possible to prevent the nozzle clogging. Also, the nozzle is arranged close to the side turn signal lamp (STSL), so that it is possible to reduce an influence on light emitted from the STSL.

Advantageous Effects of Invention

According to the vehicle sensor system and the vehicle with the vehicle sensor system of the present invention, it is possible to efficiently spray the cleaning medium toward the on-board sensor arranged on the vehicle.

Also, according to the vehicle sensor system and the vehicle with the vehicle sensor system of the present invention, when spraying the cleaning medium toward the on-board sensor for cleaning, there is no concern that the design component of the vehicle will be smudged due to the cleaning medium, and false detection of the on-board sensor due to staying of the cleaning medium can be prevented.

Also, according to the vehicle of the present invention, it is possible to easily lay out the cleaner nozzle with respect to the LiDAR, to efficiently clean the LiDAR, and to prevent malfunction of the cleaner.

Also, according to the vehicle of the present invention, it is possible to efficiently spray the cleaning medium toward the LiDAR arranged on the vehicle side part.

DESCRIPTION OF EMBODIMENTS

Hereinbelow, embodiments of the present invention will be described with reference to the drawings. Meanwhile, for the sake of convenience of description, in the embodiments, a "right and left direction", a "front and rear direction" and an "upper and lower direction" will be appropriately mentioned. The directions are relative directions set relative to a vehicle 1 shown in FIG. 1. The "front and rear direction" is a direction including a "forward direction" and a "rearward direction". The "right and left direction" is a direction including a "leftward direction" and a "rightward direction". The "upper and lower direction" is a direction including an "upward direction" and a "downward direction".

Figure 1:
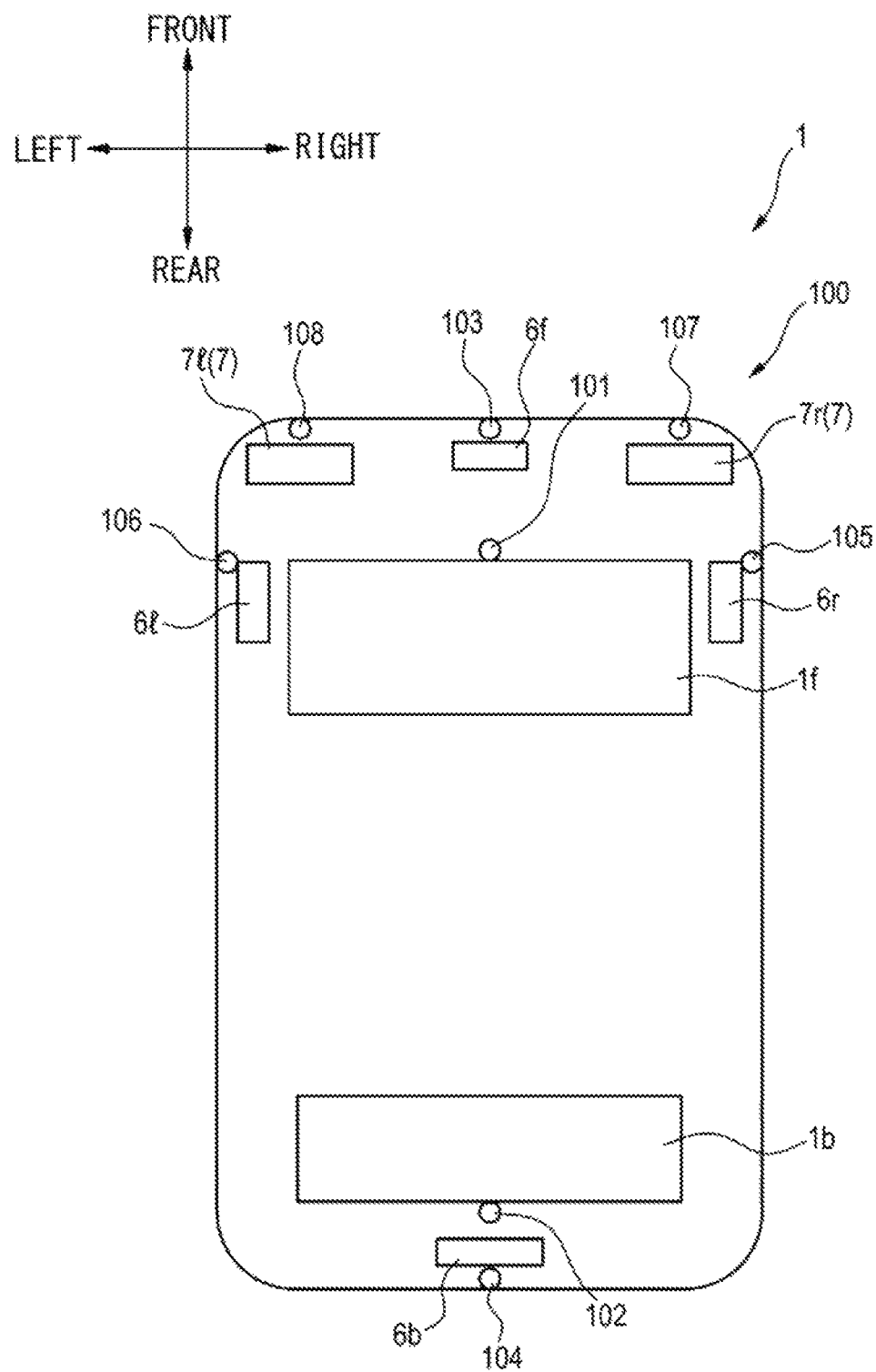
FIG. 1 is a plan view of a vehicle having a vehicle sensor system mounted thereto.

FIG. 1 is a plan view of a vehicle 1 to which a vehicle sensor system 100 (hereinbelow, referred to as "sensor system 100") in accordance with the present embodiment is mounted. The vehicle 1 is an automobile capable of traveling in an automatic driving mode in which traveling of the vehicle is automatically controlled. The vehicle 1 includes the sensor system 100 for cleaning a cleaning target object (for example, an on-board sensor) provided outside of a vehicle interior.

Figure 2:
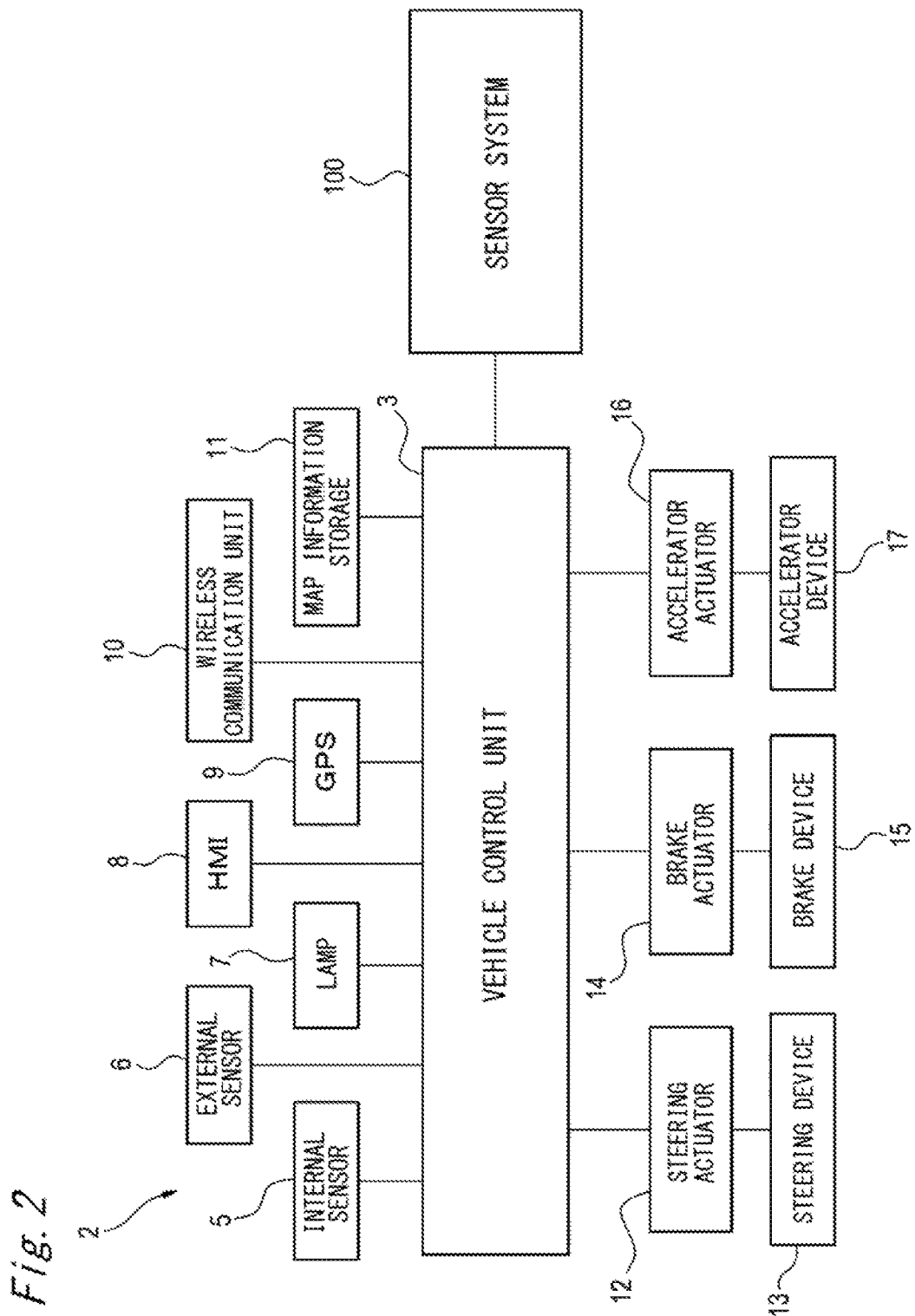
FIG. 2 is a block diagram of a vehicle system.

First, a vehicle system 2 of the vehicle 1 having the sensor system 100 mounted thereto is herein described with reference to FIG. 2. FIG. 2 is a block diagram of the vehicle system 2. As shown in FIG. 2, the vehicle system 2 includes a vehicle control unit 3 configured to control traveling of the vehicle 1. The vehicle control unit 3 is connected to an internal sensor 5, an external sensor 6 (an example of the on-board sensor), a lamp 7, an HMI 8 (Human Machine Interface), a GPS 9 (Global Positioning System), a wireless communication unit 10, and a map information storage 11. Also, the vehicle control unit 3 is connected to a steering actuator 12, a steering device 13, a brake actuator 14, a brake device 15, an accelerator actuator 16, and an accelerator device 17. Also, the vehicle control unit 3 is connected to the sensor system 100.

The vehicle control unit 3 is configured to control traveling of the vehicle 1. The vehicle control unit 3 is configured by, for example, at least one electronic control unit (ECU). The electronic control unit includes at least one microcontroller having one or more processors and one or more memories, and an electronic circuit having an active element such as a transistor and a passive element. The processor is a CPU (Central Processing Unit), an MPU (Micro Processing Unit), a GPU (Graphics Processing Unit) and/or a TPU (Tensor Processing Unit), for example. The CPU may be configured by a plurality of CPU cores. The GPU may be configured by a plurality of GPU cores. The memory includes a ROM (Read Only Memory) and a RAM (Random Access Memory). In the ROM, a vehicle control program may be stored. For example, the vehicle control program may include an artificial intelligence (AI) program for automatic driving. The AI program is a program established by a supervised or unsupervised machine learning using a neural network such as deep learning. In the RAM, the vehicle control program, vehicle control data and/or surrounding environment information indicative of a surrounding environment of the vehicle may be temporarily stored. The processor may be configured to develop, on the RAM, a program designated from the vehicle control program stored in a storage device or the ROM and to execute a variety of processing in cooperation with the RAM.

Also, the electronic control unit (ECU) may be configured by an integrated circuit (hardware resource) such as an ASIC (Application Specific Integrated Circuit), an FPGA (Field-Programmable Gate Array) and the like. Also, the electronic control unit may be configured by a combination of at least one microcontroller and an integrated circuit.

The internal sensor 5 is a sensor capable of acquiring information of a host vehicle. The internal sensor 5 is at least one of an acceleration sensor, a speed sensor, a wheel speed sensor, a gyro sensor, and the like, for example. The internal sensor 5 is configured to acquire information of the host vehicle including a traveling state of the vehicle 1, and to output the acquired information to the vehicle control unit 3. The internal sensor 5 may further include a seating sensor configured to detect whether a driver is sitting on a driver seat, a face direction sensor configured to detect a direction of a driver's face, and the like. Also, the internal sensor 5 may include an external weather sensor configured to detect an external weather condition, an illuminance sensor configured to detect an illuminance of the surrounding environment around the vehicle 1, a passenger detection sensor configured to detect whether there is a passenger in a vehicle, and the like.

The external sensor 6 is a sensor capable of acquiring external information of the host vehicle. The external sensor 6 is at least one of a LiDAR, a camera, a radar and the like, for example. The external sensor 6 is configured to acquire external information of the host vehicle including surrounding environments (other vehicles, pedestrians, road shapes, traffic signs, obstacles, and the like) of the vehicle 1 and to output the acquired information to the vehicle control unit 3.

The LiDAR is an abbreviation of Light Detection and Ranging or Laser Imaging Detection and Ranging. In general, the LiDAR is a sensor configured to emit non-visible light from a light receiving/emitting surface toward the front thereof, and to acquire information such as a distance to an object, a shape of an object, a material of an object, a color of an object and the like, based on emitted light and return light. The camera is, for example, a camera including an imaging device such as a CCD (Charge-Coupled Device) and a CMOS (complementary MOS). The camera is a camera configured to detect visible light or a camera configured to detect infrared light. The radar is a millimeter wave radar, a microwave radar, a laser radar, or the like.

The lamp 7 is at least one of a headlamp or a position lamp provided at a front part of the vehicle 1, a rear combination lamp provided at a rear part of the vehicle 1, a turn signal lamp provided at the front part or side part of the vehicle, diverse types of lamps for notifying situations of the host vehicle to a passenger and a driver of other vehicle, and the like.

The HMI 8 includes an input unit configured to receive an input operation from a driver and an output unit configured to output traveling information and the like to the driver. The input unit includes a steering wheel, an accelerator pedal, a brake pedal, a driving mode changeover switch for switching a driving mode of the vehicle 1, and the like. The output unit is a display configured to display diverse traveling information.

The GPS 9 is configured to acquire current position information of the vehicle 1 and to output the acquired current position information to the vehicle control unit 3. The wireless communication unit 10 is configured to receive traveling information of other vehicles around the vehicle 1 from the other vehicles and to transmit the traveling information of the vehicle 1 to the other vehicles (inter-vehicle communication). Also, the wireless communication unit 10 is configured to receive infrastructure information from infrastructure equipment such as a traffic light, a marker lamp and the like and to transmit the vehicle traveling information of the vehicle 1 to the infrastructure equipment (road-to-vehicle communication). The map information storage 11 is an external storage device such as a hard disk drive in which map information is stored, and is configured to output the map information to the vehicle control unit 3.

The steering actuator 12 is configured to control the steering device 13, based on a steering control signal transmitted from the vehicle control unit 3. The brake actuator 14 is configured to control the brake device 15, based on a brake control signal transmitted from the vehicle control unit 3. The accelerator actuator 16 is configured to control the accelerator device 17, based on an accelerator control signal transmitted from the vehicle control unit 3.

The vehicle 1 can drive while switching an automatic driving mode and a manual driving mode in which traveling of a vehicle is controlled by a driver's manual operation. The automatic driving mode includes a full-automatic driving mode, an advanced driving support mode, and a driving support mode. In the full-automatic driving mode, the vehicle system 2 is configured to automatically perform all traveling controls of the steering control, the brake control and the accelerator control, and the driver is not in a state where it is possible to drive the vehicle 1. In the advanced driving support mode, the vehicle system 2 is configured to automatically perform all the traveling controls of the steering control, the brake control and the accelerator control, and the driver does not drive the vehicle 1 although the driver is in a state where it is possible to drive the vehicle 1. In the driving support mode, the vehicle system 2 is configured to automatically perform a part of the traveling controls of the steering control, the brake control and the accelerator control, and the driver drives the vehicle 1 under driving support of the vehicle system 2. On the other hand, in the manual driving mode, the vehicle system 2 is configured not to automatically perform the traveling controls, and the driver drives the vehicle 1 without the driving support of the vehicle system 2.

The driving mode of the vehicle 1 can be switched by the driver operating a driving mode changeover switch. The vehicle control unit 3 is configured to switch the driving mode of the vehicle 1 among the four driving modes (the full-automatic driving mode, the advanced driving support mode, the driving support mode, and the manual driving mode) in accordance with the operation on the driving mode changeover switch. Also, the driving mode of the vehicle 1 may be automatically switched, based on information relating to a travel-allowed section where traveling of an automatic driving vehicle is allowed or a travel-prohibited section where the traveling of the automatic driving vehicle is prohibited or information relating to the external weather condition. In this case, the vehicle control unit 3 is configured to switch the driving mode of the vehicle 1, based on the acquired information. Also, the driving mode of the vehicle 1 may be automatically switched by using a seating sensor, a face direction sensor, or the like. In this case, the vehicle control unit 3 is configured to switch the driving mode of the vehicle 1, based on an output signal from the seating sensor or the face direction sensor.

When the vehicle 1 travels in the automatic driving mode, the vehicle control unit 3 automatically generates at least one of the steering control signal, the accelerator control signal and the brake control signal, based on the traveling state information, the surrounding environment information, the current position information, the map information and the like. On the other hand, when the vehicle 1 travels in the manual driving mode, the vehicle control unit 3 generates the steering control signal, the accelerator control signal and the brake control signal, in accordance with a driver's manual operation on the accelerator pedal, the brake pedal and the steering wheel. In this way, in the automatic driving mode, the traveling of the vehicle 1 is automatically controlled by the vehicle system 2, and in the manual driving mode, the traveling of the vehicle 1 is controlled by the driver.

Returning to FIG. 1, the sensor system 100 mounted to the vehicle 1 includes a front LiDAR 6*f*, a rear LiDAR 6*b*, a left LiDAR 6*l*, and a right LiDAR 6*r*, as the external sensor 6 (an example of the cleaning target object). The front LiDAR 6*f* is configured to acquire information about the front of the vehicle 1. The rear LiDAR 6*b* is configured to acquire information about the rear of the vehicle 1. The left LiDAR 6*l* is configured to acquire information about the left of the vehicle 1. The right LiDAR 6*r* is configured to acquire information about the right of the vehicle 1.

In the example of FIG. 1, the front LiDAR 6*f* is provided on a front part of the vehicle 1, the rear LiDAR 6*b* is provided on a rear part of the vehicle 1, the left LiDAR 6*l* is provided on a left side part of the vehicle 1, and the right LiDAR 6*r* is provided on a right side part of the vehicle 1. However, the present invention is not limited to the example. For example, the front LiDAR, the rear LiDAR, the left LiDAR and the right LiDAR may be integrally arranged on a ceiling part of the vehicle 1.

Also, the sensor system 100 includes a left headlamp 7*l* provided on a left part of the front part of the vehicle 1 and a right headlamp 7*r* provided on a right part of the front part, as the lamp 7 (an example of the cleaning target object). As with, the sensor system 100 includes a front window 1*f* and a rear window 1*b*, as a window shield (an example of the cleaning target object).

Also, the sensor system 100 includes nozzles 101 to 108 configured to spray a cleaning medium toward the cleaning target object. A front window washer nozzle (hereinbelow, referred to as 'front WW nozzle') 101 is configured to spray the cleaning medium toward the front window 1*f*. A rear window washer nozzle (hereinbelow, referred to as 'rear WW nozzle') 102 is configured to spray the cleaning medium toward the rear window 1*b*. A front LiDAR cleaner nozzle (hereinbelow, referred to as 'front LC nozzle') 103 is configured to spray the cleaning medium toward the front LiDAR 6*f*. A rear LiDAR cleaner nozzle (hereinbelow, referred to as 'rear LC nozzle') 104 is configured to spray the cleaning medium toward the rear LiDAR 6*b*. A right LiDAR cleaner nozzle (hereinbelow, referred to as 'right LC nozzle') 105 is configured to spray the cleaning medium toward the right LiDAR 6*r*. A left LiDAR cleaner nozzle (hereinbelow, referred to as 'left LC nozzle') 106 is configured to spray the cleaning medium toward the left LiDAR 6*l*. A right headlamp cleaner nozzle (hereinbelow, referred to as 'right HC nozzle') 107 is configured to spray the cleaning medium toward the right headlamp 7*r*. A left headlamp cleaner nozzle (hereinbelow, referred to as 'left HC nozzle') 108 is configured to spray the cleaning medium toward the left headlamp 7*l*.

Figure 3:
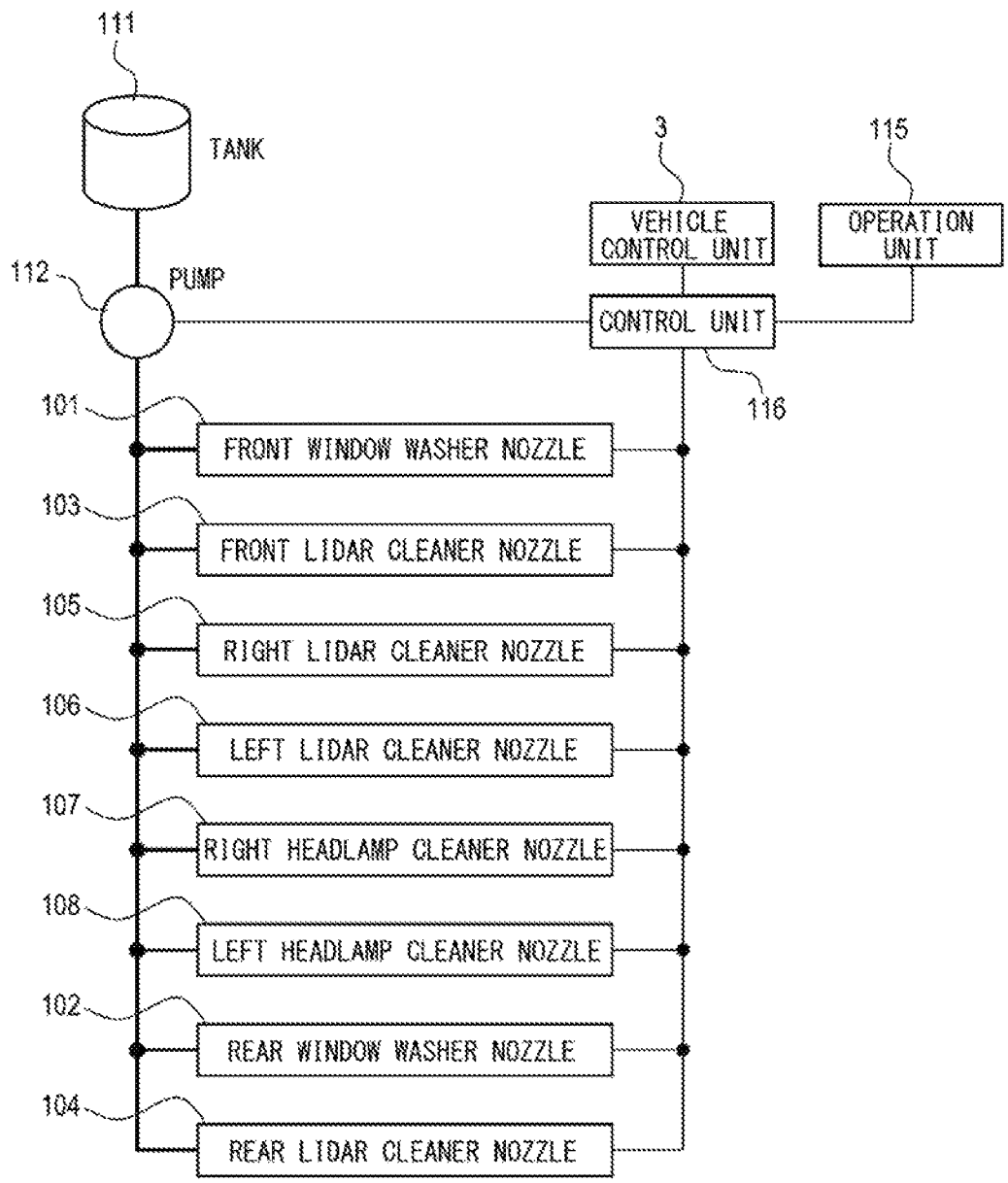
FIG. 3 is a block diagram of the vehicle sensor system.

FIG. 3 is a block diagram of the sensor system 100. As shown in FIG. 3, the sensor system 100 includes a tank 111, a pump 112, an operation unit 115, and a control unit 116, in addition to the nozzles 101 to 108. The sensor system 100 is configured to spray the cleaning medium stored in the tank 111 from each of the nozzles 101 to 108 toward the cleaning target object, thereby removing foreign matters such as water droplets, mud, grit and dust, and the like attached on the cleaning target object.

The nozzles 101 to 108 are connected to the tank 111 via the pump 112. The pump 112 is configured to transport the cleaning medium stored in the tank 111 to each of the nozzles 101 to 108. Each of the nozzles 101 to 108 is provided with an actuator configured to open the nozzle for spraying the cleaning medium toward the cleaning target object. The operation unit 115 is a device that can be operated by the driver of the vehicle 1, and is configured by a switch and the like provided in the vehicle interior, for example. The operation unit 115 is configured to output an operation signal, in correspondence to a driver's operation. The operation signal output from the operation unit 115 is input to the control unit 116.

Each actuator of the nozzles 101 to 108, the pump 112, the operation unit 115 and the vehicle control unit 3 are electrically connected to the control unit 116. The control unit 116 is configured to control an operation of the pump 112 and an operation of each actuator of the nozzles 101 to 108, based on signals input from the operation unit 115 and the vehicle control unit 3. For example, when a signal for cleaning the front LiDAR 6*f* is input to the control unit 116, the control unit 116 actuates the pump 112 to transport the cleaning medium from the tank 111 to the front LC nozzle 103, and actuates the actuator of the front LC nozzle 103 to spray the cleaning medium from the front LC nozzle 103.

In the above embodiment, the nozzles 101 to 108 are connected to the tank 111 via the pump 112. However, the present invention is not limited thereto. For example, the front WW nozzle 101, the front LC nozzle 103, the right LC nozzle 105, the left LC nozzle 106, the right HC nozzle 107, and the left HC nozzle 108 may be connected to a front tank via a front pump, and the rear WW nozzle 102 and the rear LC nozzle 104 may be connected to a rear tank via a rear pump.

First Embodiment

The front LiDAR 6*f* and the front LC nozzle 103 (a part of the cleaner) provided on the front part of the vehicle 1 are described with reference to FIGS. 4 to 9.

Figure 4:
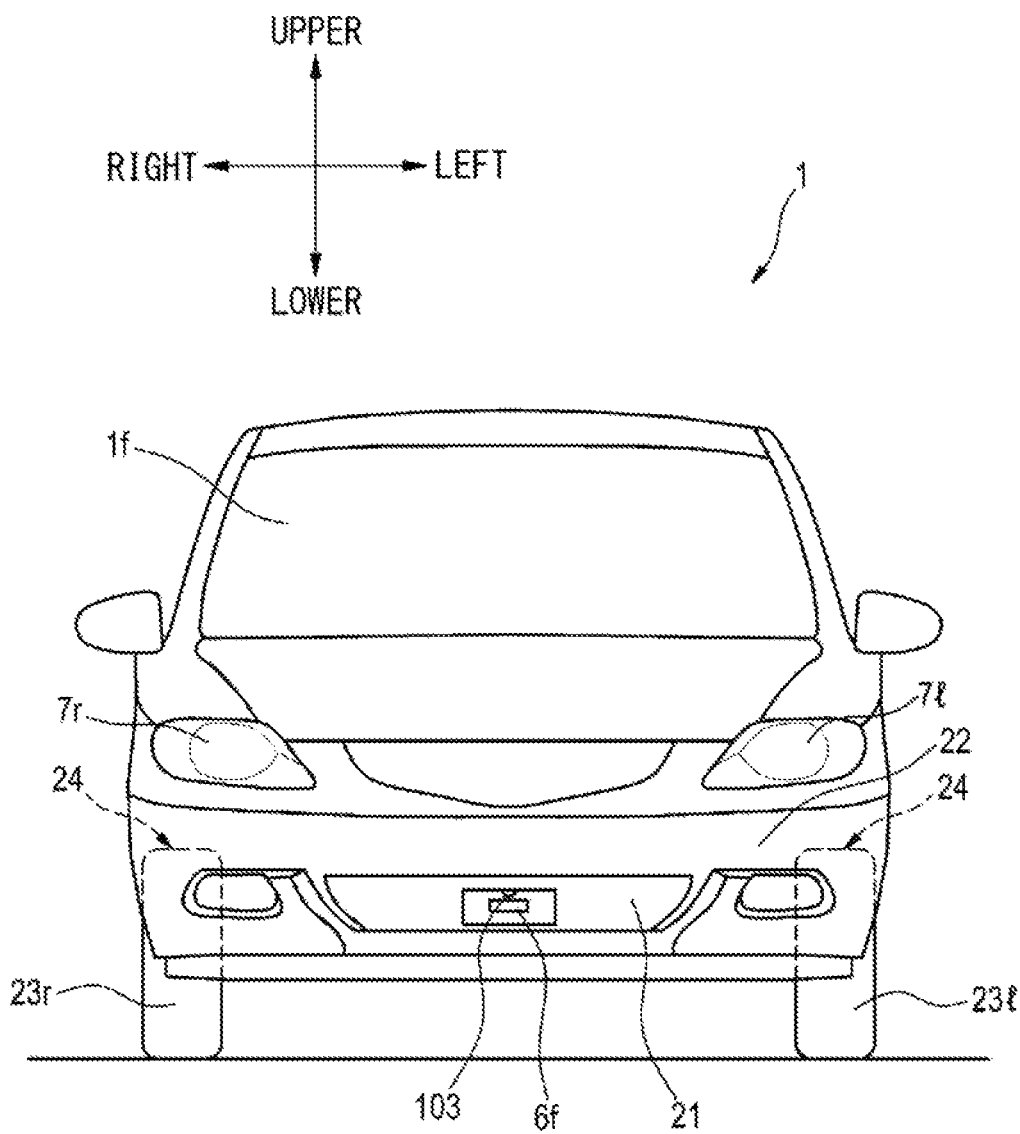
FIG. 4 depicts an on-board sensor and a cleaner in accordance with a first embodiment of the vehicle sensor system.

As shown in FIG. 4, the front LiDAR 6*f* and the front LC nozzle 103 are provided in a front grill 21 (an example of a design component configuring an outer appearance) attached to the vehicle body of the vehicle 1, for example. In the meantime, positions in which the front LiDAR 6*f* and the front LC nozzle 103 are provided are not limited to the positions shown in FIG. 4, and may be a front bumper 22 (an example of the design component configuring the outer appearance) and the like, for example. The front LiDAR 6*f* and the front LC nozzle 103 are preferably provided in an exterior component (a design component) arranged on the front part of the vehicle 1. Also, the front LiDAR 6*f* is arranged in a position lower than positions of top surfaces 24 of tires 23*r* and 23*l* mounted to the vehicle 1, for example.

Figure 5:
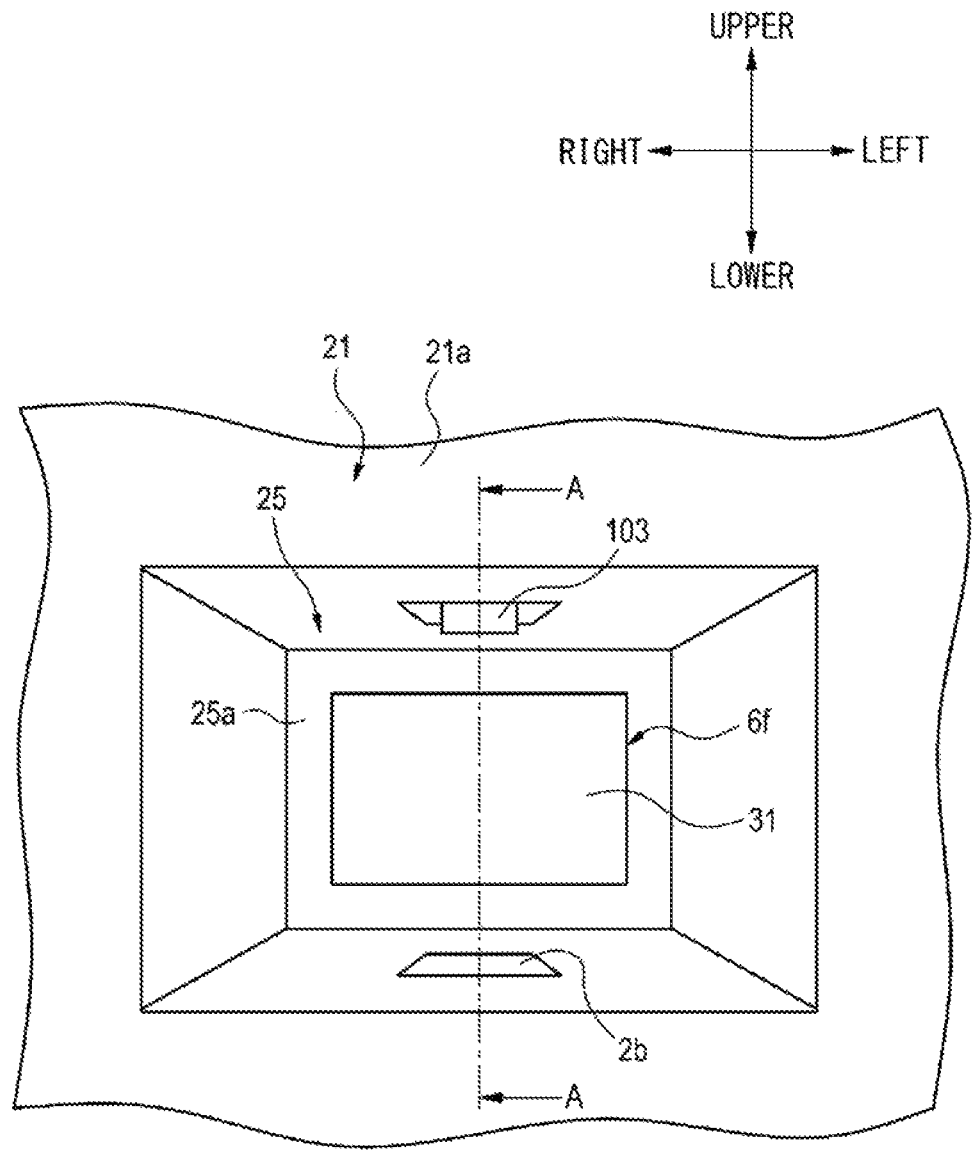
FIG. 5 is a front view depicting an example of the on-board sensor and the cleaner.
Figure 6:
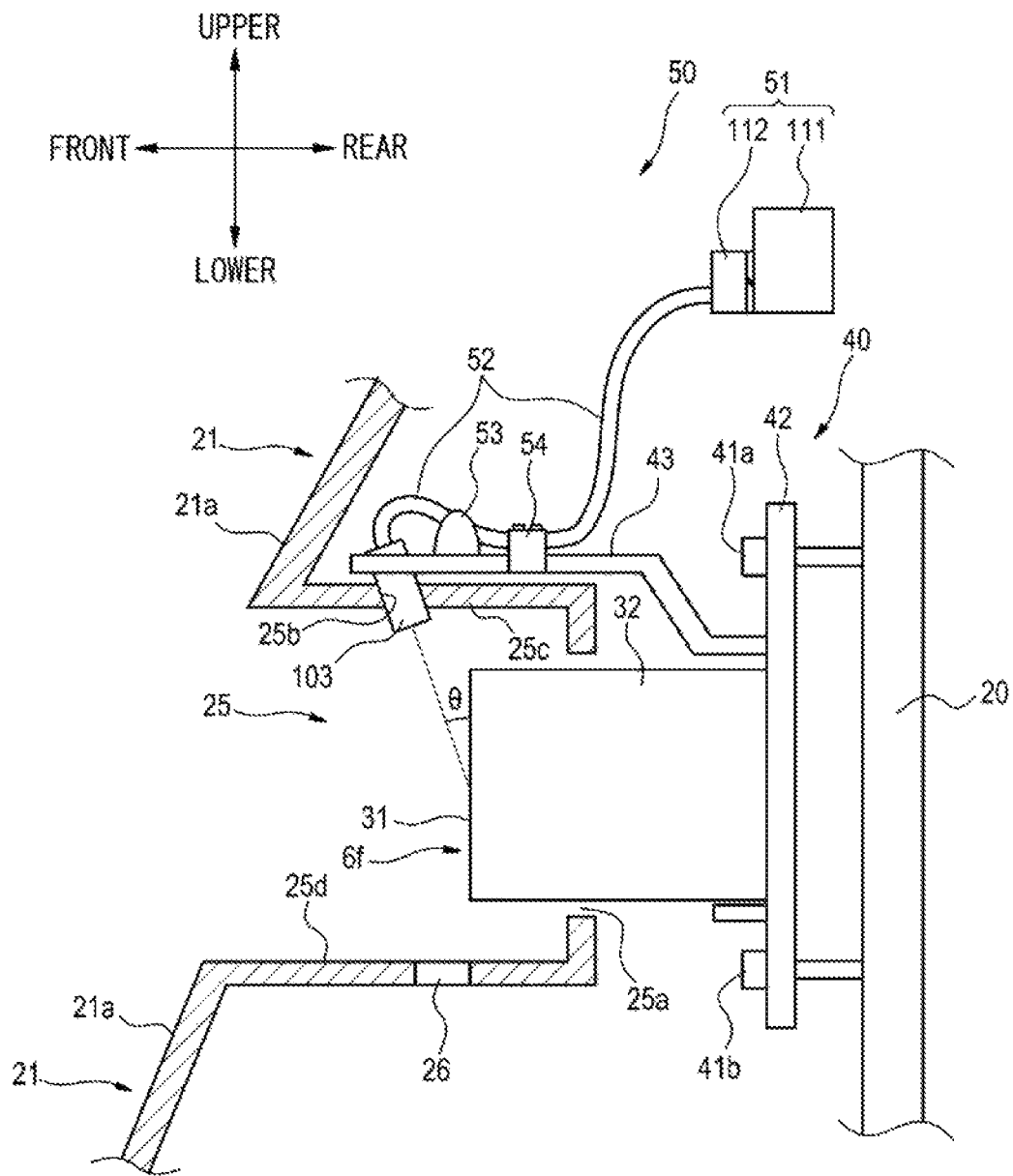
FIG. 6 is a sectional view taken along a line A-A in FIG. 5.

FIG. 5 is an enlarged front view of the front LiDAR 6*f* and the front LC nozzle 103 shown in FIG. 4. Also, FIG. 6 is a partial sectional view taken along a line A-A in FIG. 5. As shown in FIGS. 5 and 6, the front LiDAR 6*f* is provided in a concave part 25 formed at the front grill 21. The front LiDAR 6*f* is attached to a vehicle body 20 (frame) of the vehicle 1 via an aiming mechanism 40. The aiming mechanism 40 is a mechanism capable of adjusting an attaching angle of the front LiDAR 6*f* to the vehicle 1, and includes screws 41*a* and 41*b* for angle adjustment, and an aiming plate 42 attached to the screws 41*a* and 41*b*. In FIG. 6, only the two screws 41*a* and 41*b* are shown. However, the aiming mechanism 40 includes four screws penetrating four corners of the rectangular aiming plate 42.

A housing part 32 (an example of a main body) of the front LiDAR 6*f* is fixed to the aiming plate 42. The front LiDAR 6*f* fixed to the aiming plate 42 is arranged so that a part of the front LiDAR 6*f* inserted in an insertion hole 25*a* of the concave part 25 is positioned in the concave part 25. The part of the front LiDAR 6*f* arranged in the concave part 25 is provided with a light receiving/emitting surface 31 (an example of a cleaning target surface) arranged to face toward an outside of the vehicle (in the example, a front outside of the vehicle 1). The light receiving/emitting surface 31 is arranged further inside of the vehicle (a rearward direction with respect to the vehicle 1) than a front surface 21*a* of the front grill 21 (except a surface of the concave part 25).

Also, the vehicle 1 is provided with a cleaner 50 for cleaning the light receiving/emitting surface 31 of the front LiDAR 6*f*. The cleaner 50 includes the front LC nozzle 103 configured to spray the cleaning medium toward the light receiving/emitting surface 31, a main body part 51 (the tank 111 and the pump 112) configured to supply the cleaning medium, and a hose 52 (an example of a piping) for interconnecting the front LC nozzle 103 and the main body part 51.

The front LC nozzle 103 is attached to a support component 43 and is obliquely arranged on a front upper side of the front LiDAR 6*f*. The support component 43 is attached to the aiming plate 42 of the aiming mechanism 40. The support component 43 is configured to be tilted (displaced) in the same direction as the aiming plate 42 together with the aiming plate 42, in accordance with adjustment (aiming) of the attaching angle of the front LiDAR 6f is adjusted (aimed) by the aiming mechanism 40.

The front LC nozzle 103 is arranged in a position further protruding outside of the vehicle (a forward direction with respect to the vehicle 1) than the light receiving/emitting surface 31 during an operation of the cleaner 50, i.e., in a state in which the light receiving/emitting surface 31 of the front LiDAR 6f is being cleaned. A direction of the front LC nozzle 103 is angle-adjusted so that the cleaning medium sprayed from a spraying hole of the front LC nozzle 103 is to be incident onto the light receiving/emitting surface 31 at an acute angle. An incidence angle θ of the cleaning medium sprayed from the front LC nozzle 103 onto the light receiving/emitting surface 31 is, for example, 45° or smaller. Preferably, the incidence angle θ is 5° or greater and 30° or smaller.

The front LC nozzle 103 is attached with a part of the front LC nozzle 103 being inserted in an insertion hole 25b formed in a concave part upper wall 25c of the concave part 25. In the meantime, the front LC nozzle 103 may be a fixed type (non-extendible) nozzle of which a position relative to the light receiving/emitting surface 31 of the front LiDAR 6f is fixed or a pop-up type nozzle that is extended during an operation and is contracted during a non-operation.

The hose 52 is a piping member through which the cleaning medium supplied from the main body part 51 is to pass, and is connected between the pump 112 of the main body part 51 and the front LC nozzle 103. The hose 52 is provided with a check valve 53 for preventing back-flow of the cleaning medium from the front LC nozzle 103 or water and the like introduced from an outside via the front LC nozzle 103. The check valve 53 is attached to the support component 43 in a similar manner to the front LC nozzle 103. Also, the hose 52 is attached to the support component 43 by a restraint component 54 such as a band, a clip and the like.

The concave part 25 of the front grill 21 in which the front LiDAR 6f is provided is formed with a discharge hole 26 for escaping the cleaning medium sprayed from the front LC nozzle 103 and having cleaned the light receiving/emitting surface 31 from the light receiving/emitting surface 31. The discharge hole 26 is provided in an opposite position to a position in which the front LC nozzle 103 is provided, with respect to the light receiving/emitting surface 31. For example, while the front LC nozzle 103 is provided in the concave part upper wall 25c above the light receiving/emitting surface 31, the discharge hole 26 is provided in a concave part lower wall 25d below the light receiving/emitting surface 31.

Figure 7:
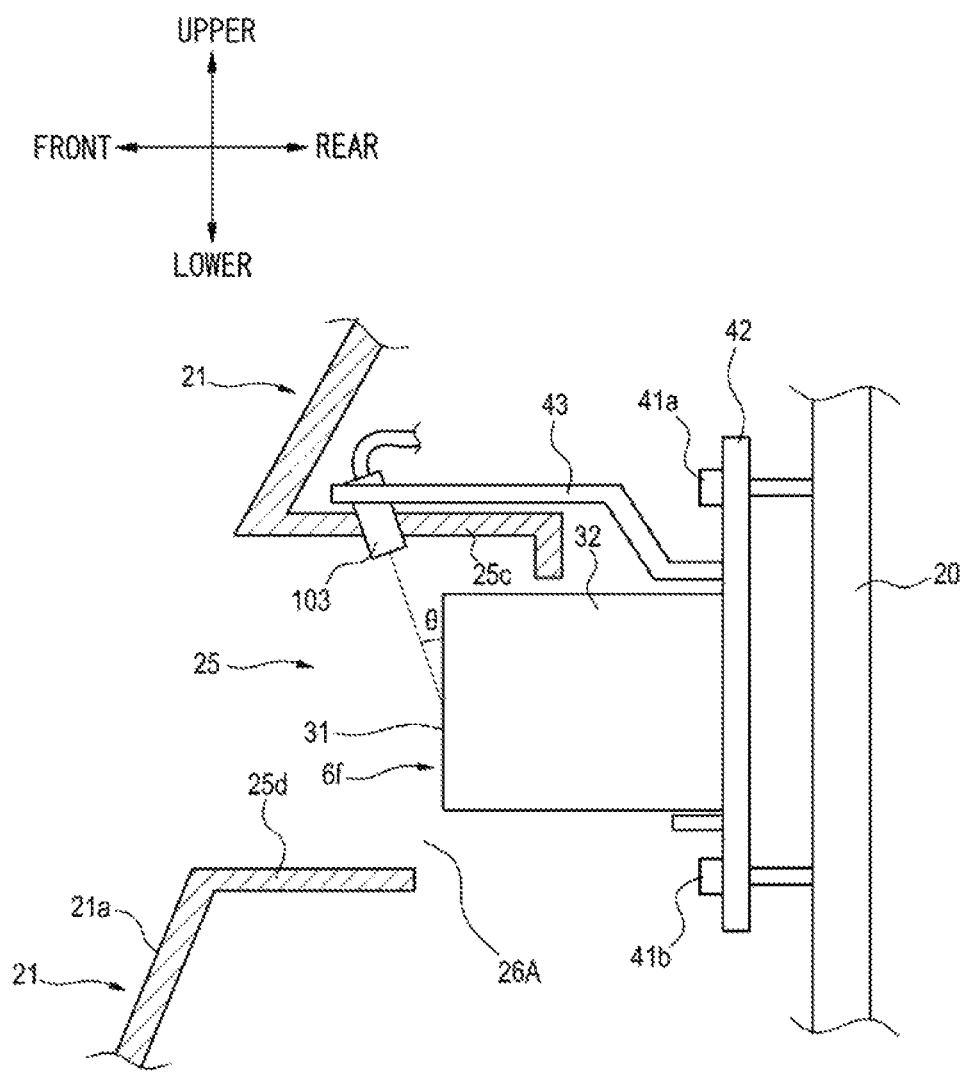
FIG. 7 depicts a first modified embodiment of a discharge hole through which a cleaning medium is to be discharged.

FIG. 7 depicts a first modified embodiment of the discharge hole formed in the concave part 25 of the front grill 21. As shown in FIG. 7, a discharge hole 26A is formed as a gap between the front grill 21 and the vehicle body 20 to which the front grill 21 is attached. The discharge hole 26A is provided as a gap formed between a rear end of the concave part lower wall 25d of the concave part 25 and the vehicle body 20, for example.

Figure 8:
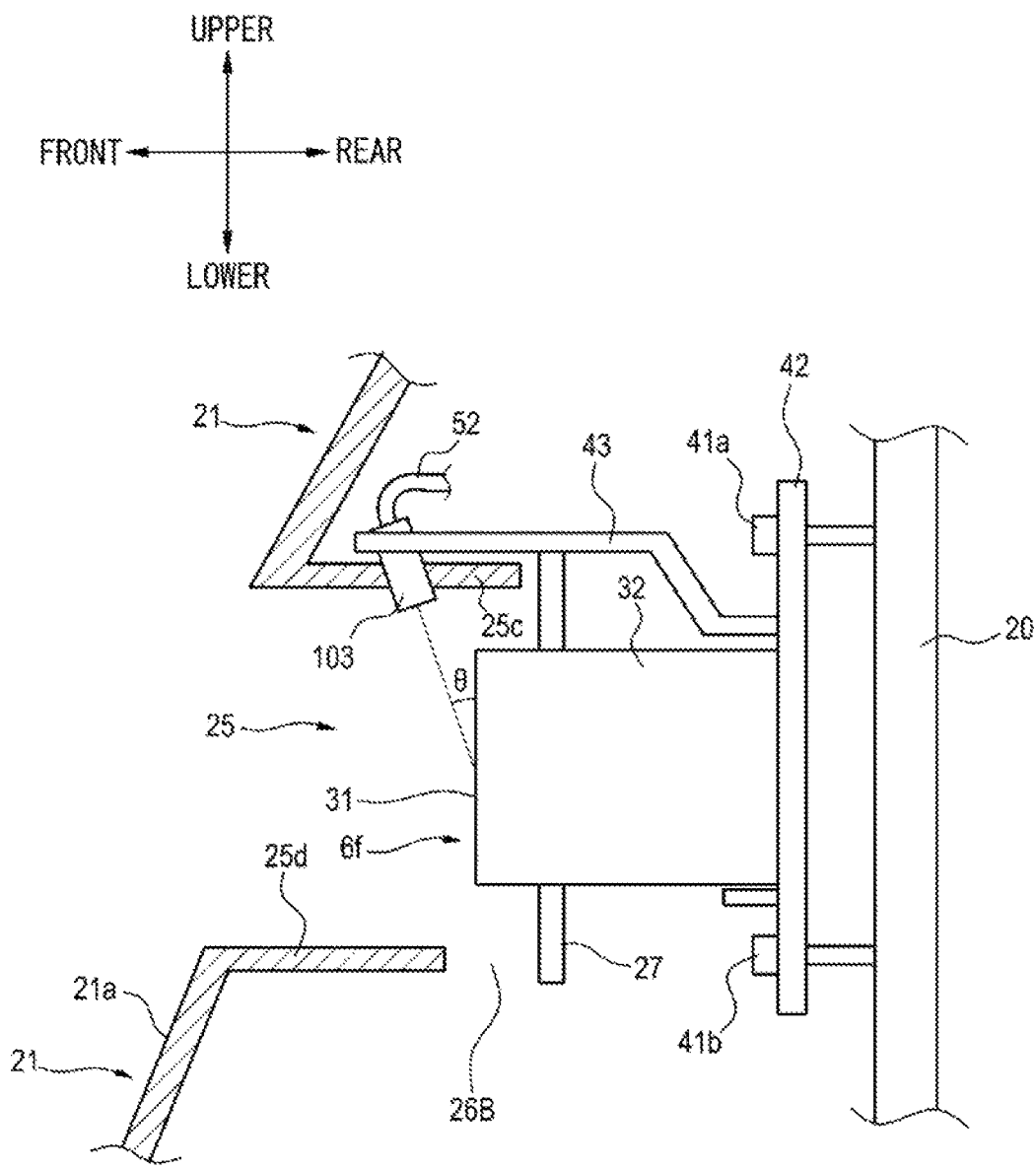
FIG. 8 depicts a second modified embodiment of the discharge hole through which the cleaning medium is to be discharged.

FIG. 8 depicts a second modified embodiment of the discharge hole formed in the concave part 25 of the front grill 21. As shown in FIG. 8, a discharge hole 26B is formed as a gap between a bezel 27 (which is a part of the vehicle body and functions to conceal the insertion hole 25a of the concave part 25 of the front grill 21) provided on an outer periphery of the front LiDAR 6f and the front grill 21. The discharge hole 26B is provided as a gap formed between the rear end of the concave part lower wall 25d of the concave part 25 and a lower end portion of the bezel 27, for example.

Figure 9:
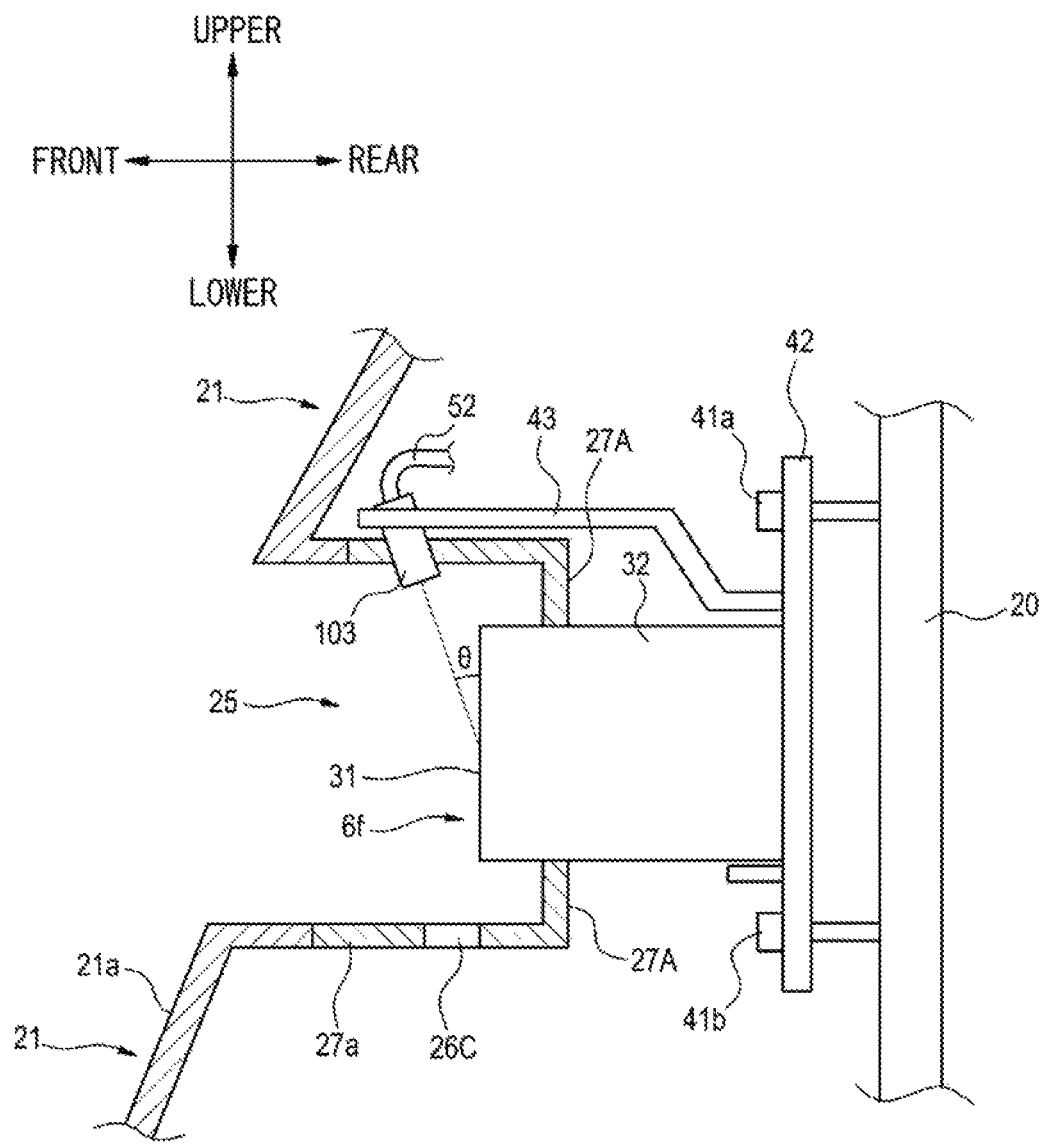
FIG. 9 depicts a third modified embodiment of the discharge hole through which the cleaning medium is to be discharged.

FIG. 9 depicts a third modified embodiment of the discharge hole formed in the concave part 25 of the front grill 21. As shown in FIG. 9, a bezel 27A is formed to have a shape configuring a part of a shape of the concave part 25. A discharge hole 26C is provided in a lower wall 27a (a portion of a part configuring the concave part 25) of the bezel 27A configuring a part of the shape of the concave part 25.

In the above example, the front LC nozzle 103 may be configured integrally with the support component 43.

Also, the support component 43 to which the front LC nozzle 103 is attached may be attached to the housing part 32 of the front LiDAR 6f, and, for example, may be integrated with the housing part 32 of the front LiDAR 6f.

Also, the long front LC nozzle 103 may be directly attached to the aiming plate 42 without the support component 43, and the front LC nozzle 103 may be configured to extend obliquely from the aiming plate 42 in the front upper direction of the front LiDAR 6f.

Also, in the above example, the front LiDAR 6f and the front LC nozzle 103 provided on the front part of the vehicle 1 have been described. However, the rear LiDAR 6b and the rear LC nozzle 104 provided on the rear part of the vehicle 1 have also similar configurations to the front LiDAR 6f and the front LC nozzle 103.

According to the sensor system 100 of the first embodiment, the front LC nozzle 103 configured to spray the cleaning medium toward the light receiving/emitting surface 31 of the front LiDAR 6f is attached to the support component 43 configured to be displaced in accordance with the angle adjustment of the front LiDAR 6f by the aiming mechanism 40. For this reason, even when the position of the front LiDAR 6f is changed due to the angle adjustment, the front LC nozzle 103 is also displaced, following the displacement of the front LiDAR 6f. Therefore, it is possible to always maintain the direction of the front LC nozzle 103 relative to the light receiving/emitting surface 31 in an appropriate same direction, and to efficiently spray the cleaning medium toward the light receiving/emitting surface 31. For example, the support component 43 is attached to the aiming plate 42 or the housing part 32 of the front LiDAR 6f, so that it is possible to increase the followability of the spraying direction of the cleaning medium from the front LC nozzle 103 to the front LiDAR 6f.

Also, the hose 52 for interconnecting the pump 112 and the front LC nozzle 103 is provided with the check valve 53. For this reason, it is possible to prevent back-flow of the cleaning medium or the like from the front LC nozzle 103 toward the pump 112.

Also, the hose 52 is attached to the support component 43 by the restraint component 54 such as a band, a clip and the like. For this reason, it is possible to prevent an influence, which is caused due to the angle adjustment of the front LiDAR 6f, on the front LC nozzle 103, for example, an interference with the front LC nozzle 103, which is caused due to deviation of the position of the hose 52 extending to the front LC nozzle 103.

Also, the front LC nozzle 103 is configured integrally with the support component 43, so that it is possible to easily enable the spraying direction of the cleaning medium from the front LC nozzle 103 to follow the displacement of the front LiDAR 6f.

Also, since the front LC nozzle 103 is provided above the front LiDAR 6f, it is possible to prevent malfunction of the cleaner 50, which is caused when the front LC nozzle 103 is clogged due to foreign matters (water droplets, mud, grit and dust, and the like) agitated from below the vehicle 1, for example. Also, it is possible to easily lay out the front LC nozzle 103 with respect to the front LiDAR 6*f*.

Also, since the cleaning medium is sprayed at an acute angle toward the light receiving/emitting surface 31 from the front LC nozzle 103 further protruding outside of the vehicle than the light receiving/emitting surface 31 in the operating state of the cleaner 50, the light receiving/emitting surface 31 can be efficiently cleaned. Also, since the light receiving/emitting surface 31 is arranged in the concave part 25 on the more inner side of the vehicle than the front surface 21*a* of the front grill 21, it is possible to easily spray the cleaning medium and to efficiently perform the cleaning.

Since the front LiDAR 6*f* is arranged in the position lower than the top surfaces 24 of the tires 23*r* and 23*l*, the foreign matters (water droplets, mud, grit and dust, and the like) are likely to be attached thereto. Therefore, for the front LiDAR 6*f* arranged in the position, the front LC nozzle 103 provided above the front LiDAR 6*f* is preferably used.

Also, the concave part 25 in which the front LiDAR 6*f* is arranged is formed with the discharge hole 26 (26A, 26B, 26C) for escaping the cleaning medium. Therefore, during the cleaning, the cleaning medium and the fouling do not remain in the concave part 25, and there is no concern that the front grill 21 will be smudged. Also, since there is no concern that the cleaning medium and the like will remain in the concave part 25, it is possible to prevent false detection of the front LiDAR 6*f* due to remnants.

Also, the front LC nozzle 103 is inserted in the insertion hole 25*b* formed in the concave part 25, and is attached with the spraying hole facing toward an inside of the concave part 25. For this reason, it is possible to easily spray the cleaning medium toward the front LiDAR 6*f* arranged in the concave part 25.

Also, the front grill 21 is attached to the vehicle body 20 of the vehicle 1, and the cleaning medium sprayed from the front LC nozzle 103 is discharged from the discharge hole 26 of the front grill 21. For this reason, when cleaning the front LiDAR 6*f*, it is possible to clean the same without smudging not only the front grill 21 but also the vehicle body 20 to which the front grill 21 is attached.

Also, the discharge hole 26B can be provided as a gap between the bezel 27 provided on the outer periphery of the front LiDAR 6*f* and the front grill 21, for example. For this reason, it is possible to easily form the discharge hole 26B by using the bezel 27 as a part of the discharge hole 26B.

Also, the discharge hole 26 (26A, 26B, 26C) is provided on the opposite side to the front LC nozzle 103 with respect to the light receiving/emitting surface 31, i.e., in the extension direction of the spraying direction of the cleaning medium sprayed from the front LC nozzle 103. For this reason, it is possible to easily discharge the cleaning medium sprayed toward the light receiving/emitting surface 31 to an outside of the concave part 25 through the discharge hole 26.

Second Embodiment

The left LiDAR 6*l* and the left LC nozzle 106 provided on a side part of the vehicle 1 are described with reference to FIGS. 10 to 12. In the meantime, the similar configurations to those in the first embodiment are denoted with the same reference signs, and the descriptions thereof are omitted.

Figure 10:
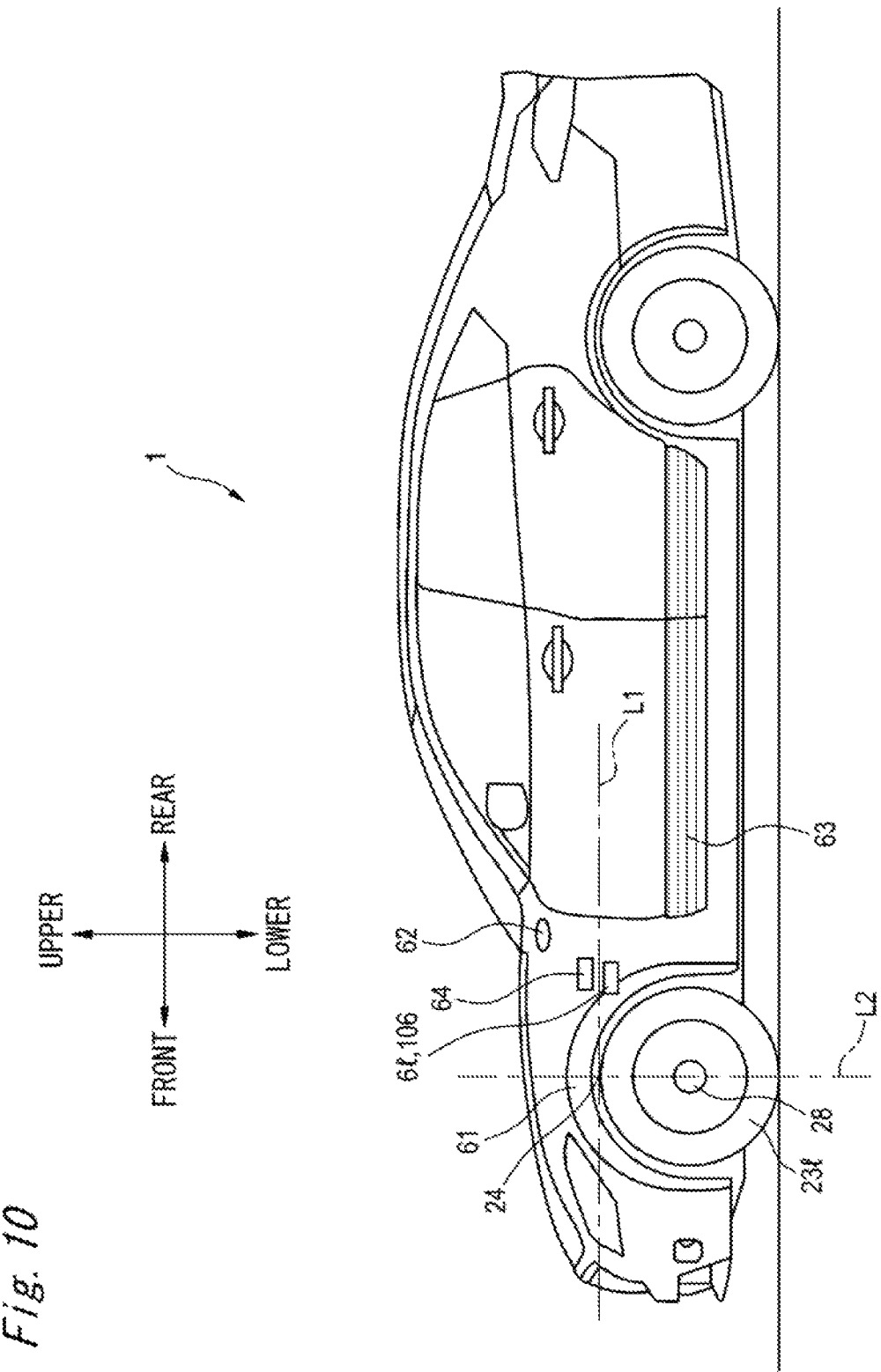
FIG. 10 depicts an example of an on-board sensor and a cleaner in accordance with a second embodiment of the vehicle sensor system.

As shown in FIG. 10, the left LiDAR 6*l* and the left LC nozzle 106 are preferably arranged in further rear positions of the vehicle than a central part 28 of a front wheel (the tire 23*l*) mounted to the vehicle 1. Also, the left LiDAR 6*l* and the left LC nozzle 106 are preferably arranged in positions lower than the top surface 24 of the tire 23*l*. That is, the left LiDAR 6*l* and the left LC nozzle 106 are preferably arranged in positions lower than a reference line L1 shown in FIG. 10. Also, the left LiDAR 6*l* and the left LC nozzle 106 are preferably arranged in the further rear position of the vehicle than the central part 28 (a reference line L2) of the tire 23*l*.

For example, the left LiDAR 6*l* and the left LC nozzle 106 are provided to a fender mole 61 (an example of a design component configuring an outer appearance) attached to an upper side of the tire 23*l* of the vehicle 1. In the meantime, the positions in which the left LiDAR 6*l* and the left LC nozzle 106 are provided may also be positions (or vicinities) of a side emblem 62, a side mole 63 and the like (examples of the design component configuring the outer appearance). The left LiDAR 6*l* and the left LC nozzle 106 are preferably provided to the exterior component (design component) arranged on a side part of the vehicle 1.

Also, for example, the left LC nozzle 106 is preferably integrated with the fender mole 61, the side emblem 62, the side mole 63 or the like. As used herein, the description "integrated" indicates that the left LC nozzle 106 is formed integrally with the fender mole 61, the side emblem 62, the side mole 63 or the like, or that the left LC nozzle 106 is fixedly attached to the fender mole 61, the side emblem 62, the side mole 63 or the like.

Also, as shown in FIG. 10, for example, the left LC nozzle 106 is preferably provided in a position in which a distance between a side turn signal lamp 64 attached to the vehicle 1 and the left LC nozzle 106 is shorter than a distance between the tire 23*l* and the left LC nozzle 106.

Figure 11:
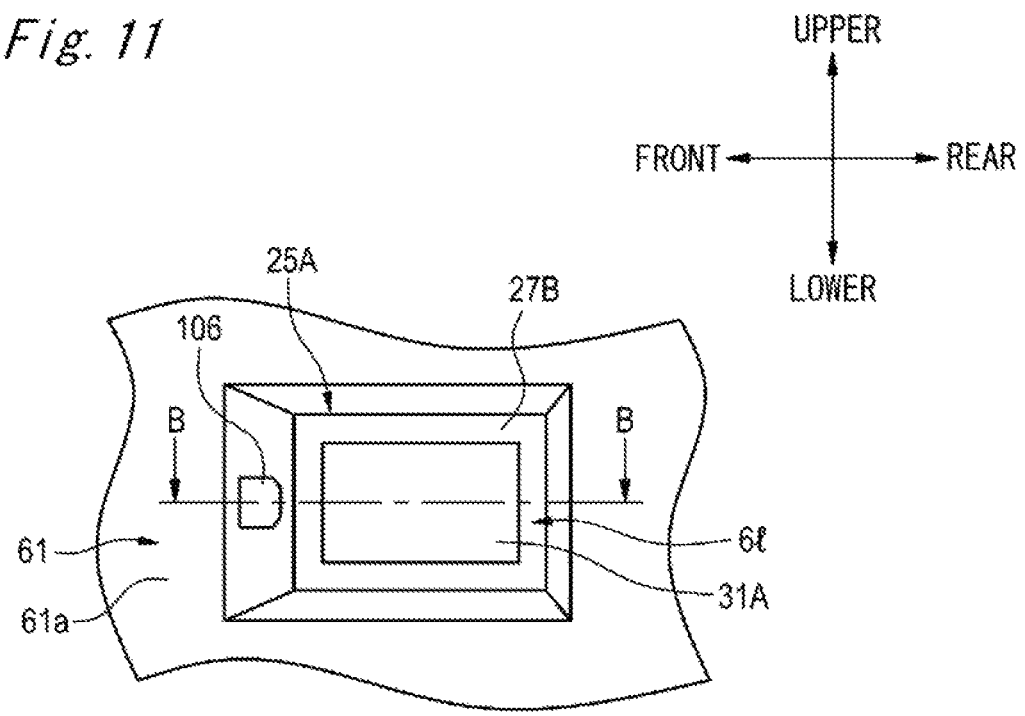
FIG. 11 is a front view depicting an example of the on-board sensor and the cleaner.
Figure 12:
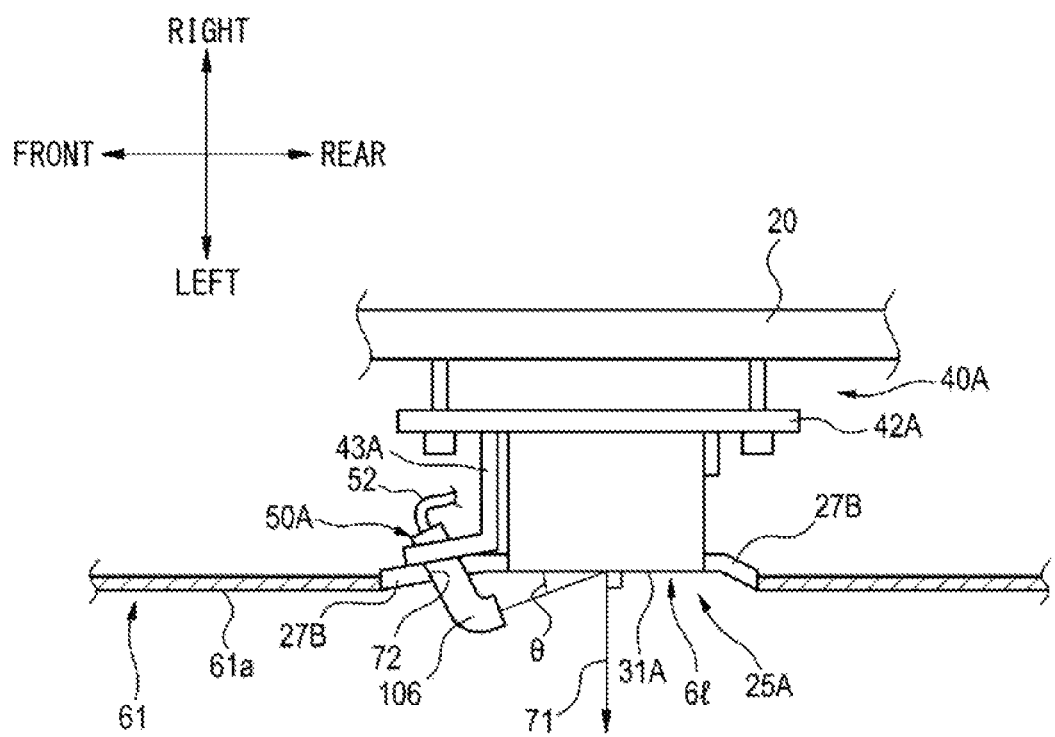
FIG. 12 is a sectional view taken along a line B-B in FIG. 11.

FIG. 11 is an enlarged view of the left LiDAR 6*l* and the left LC nozzle 106 shown in FIG. 10. Also, FIG. 12 is a partial sectional view taken along a line B-B in FIG. 11. As shown in FIGS. 11 and 12, the left LiDAR 6*l* is provided in a concave part 25A formed at the fender mole 61. The left LiDAR 6*l* is attached to the vehicle body 20 via an aiming mechanism 40A in the similar manner to the first embodiment.

The left LiDAR 6*l* provided in the concave part 25A has a light receiving/emitting surface 31A (an example of the cleaning target surface) having a normal line 71 extending to a side of the vehicle 1 (in the example, a left side of the vehicle 1). That is, the light receiving/emitting surface 31A is provided to face toward the outside of the vehicle. The light receiving/emitting surface 31A is arranged further inside of the vehicle than a surface 61*a* of the fender mole 61.

Similarly to the first embodiment, the vehicle 1 is provided with a cleaner 50A for cleaning the light receiving/emitting surface 31A of the left LiDAR 6*l*. Meanwhile, in FIG. 12, the members of the cleaner 50A except the left LC nozzle 106 and the hose 52 are not shown.

The left LC nozzle 106 is attached to a support component 43A, and is arranged in front of the left LiDAR 6*l* with respect to the vehicle. The support component 43A is attached to an aiming plate 42A of the aiming mechanism 40A, similarly to the first embodiment.

The left LC nozzle 106 is arranged in a position further protruding outside of the vehicle (a leftward direction with respect to the vehicle 1) than the light receiving/emitting surface 31A during an operation of the cleaner 50A, i.e., in a state in which the light receiving/emitting surface 31A of the left LiDAR 6*l* is being cleaned. A direction of the front LC nozzle 103 is angle-adjusted so that the cleaning medium sprayed from a spraying hole of the left LC nozzle 106 is to be incident onto the light receiving/emitting surface 31A at an acute angle. An incidence angle θ of the cleaning medium sprayed from the left LC nozzle 106 onto the light receiving/ emitting surface 31A is, for example, 45° or smaller. Preferably, the incidence angle θ is 5° or greater and 30° or smaller.

Also, the left LC nozzle 106 is attached with a part of the left LC nozzle 106 being inserted in an insertion hole 72 formed in a bezel 27B provided on an outer periphery of the left LiDAR 6*l*. The left LC nozzle 106 may be a fixed type nozzle or a pop-up type nozzle, similarly to the first embodiment. In the meantime, the bezel 27B is provided to conceal a gap from the fender mole 61 on the outer periphery of the left LiDAR 6*l*.

In the second embodiment, the left LiDAR 6*l* and the left LC nozzle 106 provided on the left side part of the vehicle 1 have been described. However, the right LiDAR 6*r* and the right LC nozzle 105 provided on the right part of the vehicle 1 have also the similar configurations to the left LiDAR 6*l* and the left LC nozzle 106.

According to the sensor system 100 having the configuration of the second embodiment, since the left LC nozzle 106 is provided in front of the left LiDAR 6*l* with respect to the vehicle, it is possible to spray the cleaning medium without opposing traveling wind. For this reason, it is possible to efficiently spray the cleaning medium toward the light receiving/emitting surface 31A of the left LiDAR 6*l* provided on the side part of the vehicle 1 and to clean the same.

Also, since the cleaning medium is sprayed at an acute angle toward the light receiving/emitting surface 31A from the left LC nozzle 106 further protruding outside of the vehicle than the light receiving/emitting surface 31A, it is possible to efficiently clean the light receiving/emitting surface 31A.

Since the left LiDAR 6*l* is arranged in at least one of the position lower than the top surface 24 of the tire 23*l* and the position at the rear of the central part 28 of the tire 23*l* with respect to the vehicle, the foreign matters (water droplets, mud, grit and dust, and the like) are likely to be attached thereto. Therefore, for the left LiDAR 6*l* arranged in the position, the left LC nozzle 106 provided in front of the left LiDAR 6*l* with respect to the vehicle is used, so that it is possible to efficiently remove the foreign matters attached on the left LiDAR 6*l*.

Also, the left LC nozzle 106 is integrated with the fender mole 61, the side emblem 62, the side mole 63 or the like. For this reason, the left LC nozzle becomes a part of a design of the corresponding member, so that it is possible to make the left LC nozzle 106 be unnoticeable from the outside.

Also, the left LC nozzle 106 is provided in the position in which the distance to the side turn signal lamp 64 is shorter than the distance to the tire 23*l*. In this way, the left LC nozzle 106 is spaced from the tire 23*l* as much as possible, so that it is possible to prevent the left LC nozzle 106 from being clogged due to the foreign matters (water droplets, mud, grit and dust, and the like) agitated by the tire 23*l*. Also, the left LC nozzle 106 is arranged close to the side turn signal lamp 64, so that it is possible to reduce an influence on the light emitted from the side turn signal lamp 64.

Although the embodiments of the present invention have been described, it goes without saying that the technical scope of the present invention should not be interpreted as being limited by the descriptions of the embodiments. It will be understood by one skilled in the art that the embodiments are just exemplary and that the embodiments can be diversely changed within the scope of the invention defined in the claims. The technical scope of the present invention should be determined on the basis of the scope of the invention defined in the claims and its equivalent scope.

The subject application is based on Japanese Patent Application No. 2017-180320 filed on Sep. 20, 2017, Japanese Patent Application No. 2017-180321 filed on Sep. 20, 2017, Japanese Patent Application No. 2017-180322 filed on Sep. 20, 2017, and Japanese Patent Application No. 2017-180323 filed on Sep. 20, 2017, the contents of which are appropriately incorporated herein.

The invention claimed is:

1. A vehicle sensor system comprising:
   an on-board sensor that can be attached to a vehicle via an aiming mechanism configured to adjust an aiming direction of the on-board sensor; and
   a cleaner having a nozzle configured to spray a cleaning medium toward the on-board sensor,
   wherein the nozzle is attached to a component configured to be displaced in accordance with the aiming direction of the on-board sensor, and
   wherein an angle of the nozzle with respect to the on-board sensor is unchanged when the aiming direction of the on-board sensor is changed by the aiming mechanism.

2. The vehicle sensor system according to claim 1, wherein the nozzle is attached to a support component attached to the aiming mechanism.

3. The vehicle sensor system according to claim 1, wherein the nozzle is attached to a support component attached to a main body of the on-board sensor.

4. The vehicle sensor system according to claim 2, wherein the cleaner further comprises a check valve, and wherein the check valve is attached to the support component.

5. The vehicle sensor system according to claim 2, wherein a component configured to restrain a piping for supplying the cleaning medium from a main body of the cleaner to the nozzle is attached to the support component.

6. The vehicle sensor system according to claim 2, wherein the support component and the nozzle are integrally configured.

7. A vehicle comprising:
   a LiDAR; and
   a cleaner capable of cleaning a cleaning target surface of the LiDAR,
   wherein the cleaner comprises a nozzle provided above the LiDAR, and further protruding outside of the vehicle than a cleaning target surface of the LiDAR and configured to spray a cleaning medium at an acute angle toward the cleaning target surface in an operating state of the cleaner, and
   wherein the nozzle is configured to be displaced in accordance with an angle adjustment of the LiDAR such that an incidence angle of the cleaning medium sprayed from the nozzle onto the cleaning target surface remains constant.

8. The vehicle according to claim 7, wherein the incidence angle of the cleaning medium sprayed from the nozzle onto the cleaning target surface is equal to or smaller than 45°.

9. The vehicle according to claim 8, wherein the incidence angle is 5° or greater and 30° or smaller.

10. The vehicle according to claim 7, wherein the cleaning target surface is arranged further inside of the vehicle than an exterior surface of the vehicle.

11. The vehicle according to claim 7, wherein the LiDAR is arranged in a position lower than a top surface of a tire mounted to the vehicle.

12. A vehicle comprising:
   a LiDAR having a cleaning target surface having a normal line extending to a side of the vehicle; and a cleaner capable of cleaning the cleaning target surface,
wherein the cleaner comprises a nozzle provided in front of the LiDAR with respect to a travel direction of the vehicle, and further protruding outside of the vehicle than the cleaning target surface of the LiDAR and configured to spray a cleaning medium at an acute angle toward the cleaning target surface in an operating state of the cleaner, and
wherein the LiDAR is arranged in a position lower than a top surface of a front wheel mounted to the vehicle and a further rear position of the vehicle than a central part of the front wheel.

13. The vehicle according to claim 12, wherein an incidence angle of the cleaning medium sprayed from the nozzle onto the cleaning target surface is equal to or smaller than 45°.

14. The vehicle according to claim 13, wherein the incidence angle is 5° or greater and 30° or smaller.

15. The vehicle according to claim 12, wherein the nozzle is integrated with a fender mole or an emblem of the vehicle.

16. The vehicle according to claim 12, wherein a distance between a side turn signal lamp attached to the vehicle and the nozzle is shorter than a distance between a front wheel of the vehicle and the nozzle.

17. A vehicle, comprising the vehicle sensor system according to claim 1.

* * * * *